March 15, 1966     W. F. RUHLAND ETAL     3,240,252
TIRE REMOVAL TOOL
Filed April 9, 1964     2 Sheets-Sheet 1
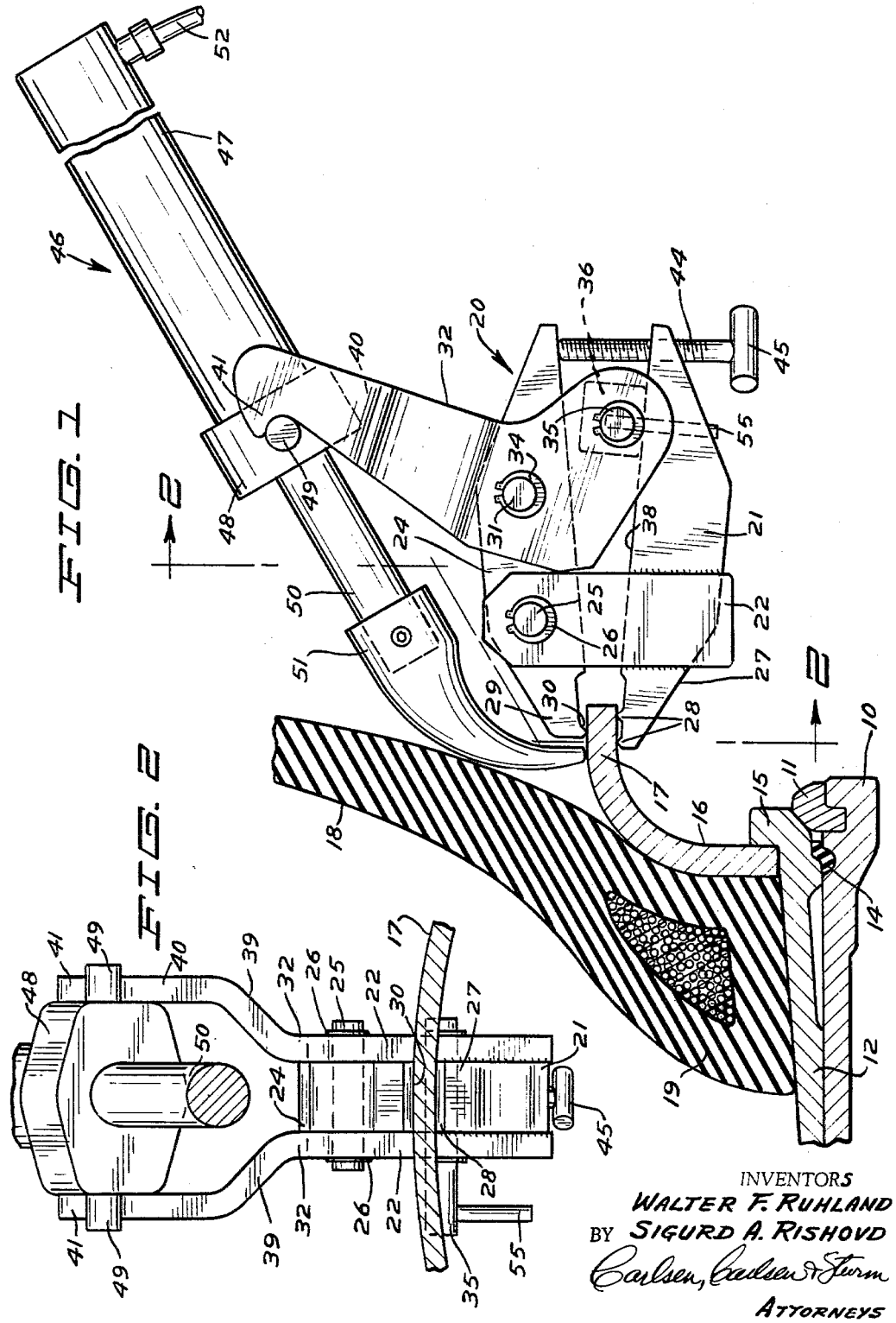
INVENTORS
WALTER F. RUHLAND
BY SIGURD A. RISHOVD
ATTORNEYS

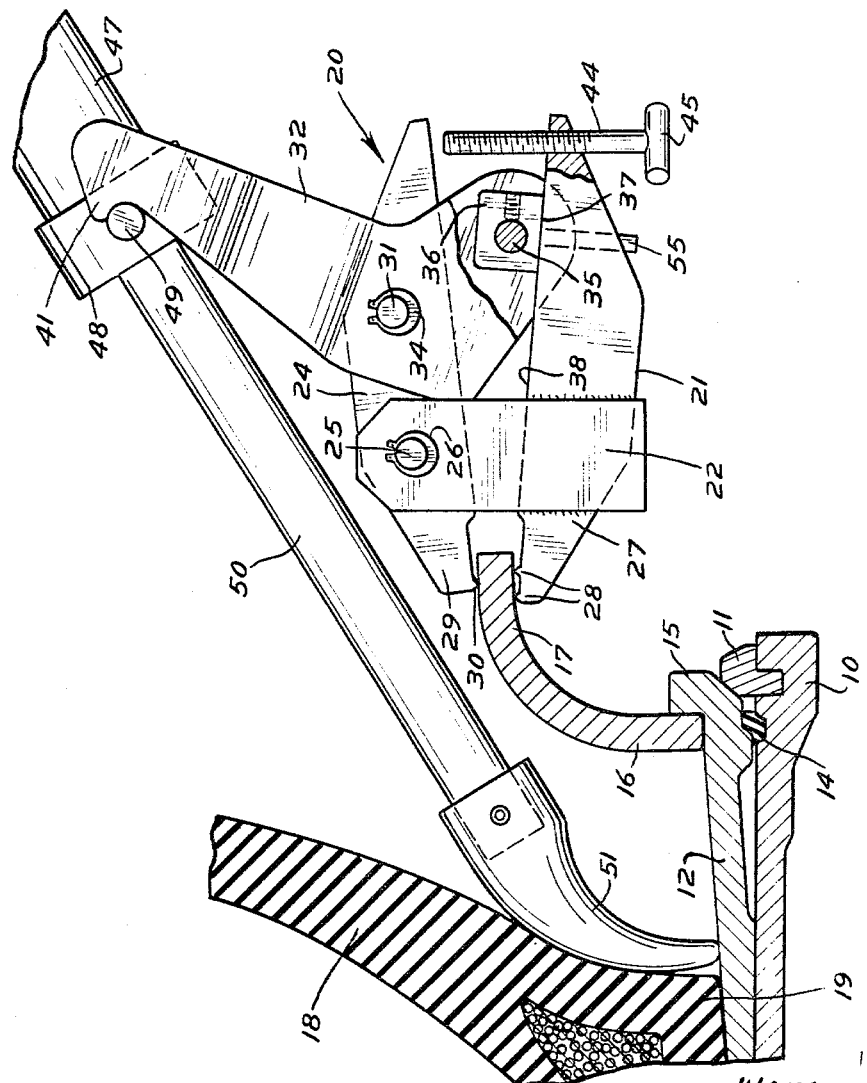

3,240,252
TIRE REMOVAL TOOL
Walter F. Ruhland, Shakopee, and Sigurd A. Rishovd, Minneapolis, Minn., assignors to Bishman Manufacturing Company, Osseo, Minn., a corporation of Minnesota
Filed Apr. 9, 1964, Ser. No. 358,589
7 Claims. (Cl. 157—1.17)

This invention relates generally to tools for removing tires from the wheels on which they are mounted and particularly concerns such tools for "bead breaking" or moving the tire side wall inwardly along the wheel rim.

The object of the invention is to provide a new and improved bead breaker utilizing a rim clamp for engaging a wheel rim and an extensible member for pressure movement against a side wall of a tire mounted on the rim with means connecting the extensible member to the rim clamp to transmit reactive forces from said pressure movement to the rim clamped to tighten the clamp on the rim.

Another object of the invention is to provide a bead breaking device for clamping attachment to a wheel having a rim flange portion extending axially of the wheel which device includes a clamp adapted to engage said portion for self-support in an operative position without the aid of auxiliary means.

With these objects in view the invention broadly comprises a bead beaker including a clamp having a pair of pivotally connected jaws for clamping engagement with a wheel rim, a ram member having an extensible tire engaging shoe, and a lever pivoted medially on the clamp and having one end connected to the jack and the other end engageable with one of the jaws to transfer reactive pressure on the jack as the shoe is extended to said jaw to relatively close or tighten the jaws on the rim. The invention is further characterized by providing the jaws with opposing teeth so arranged as to enable the clamp to maintain a clamping position with respect to the rim without the need of auxiliary support means.

The above mentioned and still additional objects will be brought to light during the course of the following specification, reference being made to the accompanying drawings, in which:

FIG. 1 is a side elevation of the tool in its initial clamping position on the wheel rim and prior to actuation of the bead breaker ram.

FIG. 2 is an inner end elevation of the clamping device taken on line 2—2 of FIG. 1, the extensible portion of the ram being in section.

FIG. 3 is similar to FIG. 1 but showing the relative position of the components after the ram has been actuated for bead breaking action against the tire.

Referring now more particularly to the drawings, reference characters will be used to denote like parts or structural features in the different views. In FIGS. 1 and 3 a portion of a rim and tire assembly is shown to be worked on by the tool. The assembly, shown in cross section, includes an annular rim 10 which is peripherally grooved near its outer edge to receive a split lock ring 11 which retains a bead seat ring 12. A sealing ring 14 may be provided between the rim 10 and ring 12. The ring 12 has its outer edge angled outwardly as at 15 to retain a rim flange 16 which curves outwardly with its peripheral edge portion 17 extending outwardly in an axial direction with respect to the rim. A tire 18 having a conventional bead 19 is mounted on the rim with the bead seated around ring 12 and normally held securely against the flange 16 by air pressure within the tire. As above, and for convenience of description here throughout, the term "inward" will refer to the direction from the flange 16 toward the bead 19, and the term "outward" the opposite direction.

The tool which is the subject of the invention is designed for the purpose of moving the bead 19 inwardly in an axial direction along the seat ring 12 when the tire has been deflated. The basic structure of the tool is a clamping device designated generally at 20 comprising a lower jaw member 21 having a pair of upright side plates 22 integrally secured thereto in opposing relation on opposite sides of the jaw, and an upper jaw member 24 disposed between the upper portions of the plates 22 and journaled on a cross pin 25 which is mounted between the side plates 22 by snap rings 26.

The jaws 21 and 24 are of elongated design and are arranged in substantial parallelism in vertically spaced opposing relation with the plates 22 and pin 25 interconnecting the members near the inner or forward ends thereof. Inwardly of plate 22 the jaw member 21 is provided with jaw 27 having a pair of upwardly directed gripping teeth 28, while jaw member 24 is provided with a jaw 29 having a single downwardly directed gripping tooth 30 which is vertically opposite the space between teeth 28 when the tool is in operating position as shown in the drawings.

A pivot pin 31 extends transversely through and is journaled in the rear portion of the upper jaw member 24. The end portions of the pin project beyond the jaw member and respectively carry transversely opposing lever arms 32 which are held on the pin by snap rings 34. Below the pin 31 the arms 32 jointly journal a pin 35 on which there is irrotatably mounted between the arms a slide block 36. This block is rectangular in cross section and has a flat bottom side 37 (FIG. 3) which rests flush against the flat top surface 38 of the lower jaw outwardly of side plates 22 for sliding movement therealong.

Above pin 31 the arms 32 diverge outwardly as at 39 (FIG. 2) and then upwardly as at 40 in spaced parallelism with forwardly opening hooks 41 at their upper ends. It will be noted that the distance along the arms between pin 31 and hooks 41 is substantially greater than the distance between the pins 31 and 35. A mounting clamp screw 44 having a handle 45 is threaded upwardly through the outer end portion of jaw member 21 for pressure engagement of the end of the screw with the outer end portion of jaw 24.

A pneumatic or hydraulic ram, designated generally at 46, is used in operation of the tool 20. This ram has an elongated cylinder 47, one end of which is provided with a trunnion member 48 having laterally projecting studs 49 adapted to be respectively seated in the hooks 41. A piston member 50 slidably disposed within the cylinder 47 extends inwardly therefrom and carries a bead engageable shoe 51 at its inner end. The opposite or outer end of the cylinder 47 is suitably connected to line 52 which leads from a source of compressed air or hydraulic fluid.

The operation of the device will now be described. In normal tire and wheel assembly the bead 19 of the tire is in firm sidewise engagement with the rim flange 16, as shown in FIG. 1. When it is desired to unseat the bead, after deflation of the tire, the tool 20 is attached to the portion 17 of the rim as in FIG. 1. To effect such attachment the tool jaws 27 and 29 are placed on opposite sides of the flange and the clamp screw 44 threaded inwardly spreading the rear portions of the jaw members 21 and 24 until the teeth 28 and 30 are forced into firm biting engagement with the rim portion 17. So clamped the tool will, without additional support, rest on the rim in the position shown in FIG. 1, due to the dual teeth 28 engaging the rim on longitudinally opposite sides of tooth 40.

The ram 46 is then placed in position with the studs 49 in hooks 41 and the shoe 51 directed inwardly toward the side of the tire. Fluid is then admitted to the cylinder to extend the piston 50. It will be understood that as the shoe 51 moves inwardly against the tire, the counteracting force therefrom will be transmitted outwardly through hooks 41 to the lever arms 32. Inasmuch as the arms 32 are pivoted on pin 31, they serve as levers transmitting the rearward force thereon to the slide block 36 located outwardly and below pin 31 with the result that the block exerts downward pressure on jaw member 21. This pressure obviously tends to spread the outer end portions of the jaw members and close the jaws 27 and 29 about the pivot pin 25 to tighten the grip of the teeth 28 and 40 on the rim flange. Thus as the shoe 51 is powered inwardly toward the position shown in FIG. 3 to break the bead, the gripping force of the tool 20 on the flange 16 will be increased to securely retain it on the flange.

As the piston element 50 extends from the cylinder, the jack is free to pivot about the axis of the studs 49 allowing the shoe 51 to slide down along the side of the bead 19 against the ring 12, and then inwardly along ring 12 until the engaged portion of the bead is unseated from the ring. The tool is then attached to other circumferentially spaced portions of the rim 16 and the operation repeated to dislodge the entire bead from the bead seat ring.

It will be noted that the pin 35 extends through the slide block 36 in an off-center position. It is in fact preferred that the axis of pin 35 be disposed at four different progressive distances from the respective surrounding walls of the block as shown. This is to enable rotary adjustment of the block to facilitate efficient use of the tool on rims of varying thickness. The pin 35 is provided with a radially extending handle 55 for manual rotary adjustment of the block prior to application of the jack to the tool.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a tire bead breaker tool, a clamp device having a pair of pivotally interconnected jaw members having inner ends adapted to grip the flange of a tire supporting rim therebetween as the outer end portions thereof are spread, a lever arm having its medial portion pivoted to the clamp device on an axis parallel to said jaw member pivot, said lever arm having one end formed for connection with the cylinder of a ram having a tire engaging shoe member extendible from the cylinder and its other end engageable with one of said jaw member outer end portions to transmit the reactive force on the cylinder as the shoe member is extended against a rim supported tire to said outer end jaw portion to cause such spreading movement of the jaw members.

2. The subject matter of claim 1 in which there are a pair of such lever arms mounted on the clamp device in spaced relation on a common pivot axis, said other ends of the lever arms being interconnected by a cross member, and said cross member being in slidable engagement with said one jaw member outer end portion.

3. The subject matter of claim 2 in which said cross member is provided with adjustment means to vary the distance between its engagement with said jaw member and the lever arm pivot axis.

4. In a tool for unseating the bead of a tire mounted on a rim having a rim flange extending outwardly in a direction away from the tire, a pair of jaw members pivotally interconnected for relative closing at one side of the pivot as they are relatively spread on the other side of the pivot, a ram having an extensible piston extending toward the tire, a lever member pivoted medially on one jaw member and having one end connected to the ram to receive the reaction force as the piston is extended to engage the tire and the other end engaging the other jaw member to cause such relative spreading movement as said reaction force is increased.

5. In a tire removal tool for removing a tire from a wheel rim having a flange the peripheral portion of which extends away from the tire in an axial direction, a pair of elongated clamp members pivotally interconnected at their medial portions and having opposing clamp jaws at one side of the pivot for relative opening and closing movement as the jaws are moved about the pivot, lever means pivotally connected to one of the clamp members on an axis parallel to the clamp member pivot, a fluid extensible ram member having a cylinder and an extensible piston, a tire engaging shoe mounted on the piston, means connecting the cylinder to the lever means at a point spaced radially from the lever means pivot, and cam means on the lever means in sliding engagement with the other clamp member for moving said other clamp member about the clamp member pivot as extension of the ram member causes the lever means to move about the lever means pivot.

6. The subject matter of claim 5 wherein said jaws have opposing flange gripping surfaces with one surface having one tooth and the other surface having a pair of spaced teeth with said one tooth arranged to contact the flange opposite the space between said pair.

7. In the tire removal tool for removing a tire from a wheel rim having a flange the peripheral portion of which extends away from the tire in an axial direction, a clamping device for clamping engagement with said flange portion, said clamping device including a pair of elongated clamp members arranged in general parallelism to extend in said axial direction with their inner ends toward the tire and their outer ends away from the tire, said members having opposing jaws at their inner ends for engaging opposite sides of the flange portion, means pivotally interconnecting the medial portions of the clamp members whereby any spreading of the outer end portions of the clamp members will move the jaws in a relatively closing direction, an elongated ram member disposed on the common plane of the clamp members and having inner and outer parts adapted for relative extension under pressure, said inner part carrying a shoe for engagement against the tire, said outer part having a connector element thereon, an elongated lever member pivoted medially on the outer end portion of one of said clamp members on an axis parallel to said clamp member pivotal interconnection, said lever member having one end connected to said connector element and having cam means at its other end engageable with the outer end portion of the other of said clamp members whereby as the ram is extended with the shoe against the tire said outer part will tend to move outwardly away from the tire moving the lever member about its pivot with the cam means spreading said outer end portions of the clamp members.

No references cited.

GRANVILLE Y. CUSTER, Jr., *Primary Examiner.*